United States Patent
Fahn et al.

(10) Patent No.: US 8,810,545 B2
(45) Date of Patent: Aug. 19, 2014

(54) CONTROL CIRCUIT AND DUAL TOUCH CONTROL METHOD THEREOF FOR A FOUR-WIRE RESISTIVE TOUCH PANEL

(75) Inventors: Chin-Shyurng Fahn, Taipei (TW); Hung-Yi Lin, Taipei (TW)

(73) Assignee: National Taiwan University of Science and Technology, Taipei (TW)

( * ) Notice: Subject to any disclaimer, the term of this patent is extended or adjusted under 35 U.S.C. 154(b) by 246 days.

(21) Appl. No.: 13/551,725

(22) Filed: Jul. 18, 2012

(65) Prior Publication Data

US 2013/0181939 A1      Jul. 18, 2013

(30) Foreign Application Priority Data

Jan. 18, 2012   (TW) .............................. 101101876 A

(51) Int. Cl.
*G06F 3/045*           (2006.01)
(52) U.S. Cl.
USPC .................. 345/174; 345/173; 178/18.05
(58) Field of Classification Search
CPC ................................. G06F 3/045; G06F 3/041
USPC .............................. 345/173, 174; 178/18.05
See application file for complete search history.

(56) References Cited

U.S. PATENT DOCUMENTS

| | | | |
|---|---|---|---|
| 8,294,688 B2* | 10/2012 | Sarasmo | 345/174 |
| 2003/0063073 A1* | 4/2003 | Geaghan et al. | 345/173 |
| 2006/0139340 A1* | 6/2006 | Geaghan | 345/177 |
| 2007/0236478 A1* | 10/2007 | Geaghan et al. | 345/173 |
| 2009/0322700 A1* | 12/2009 | D'Souza et al. | 345/174 |
| 2009/0322701 A1* | 12/2009 | D'Souza et al. | 345/174 |
| 2010/0149122 A1* | 6/2010 | Lin | 345/173 |
| 2010/0277417 A1* | 11/2010 | Sarasmo | 345/173 |
| 2010/0283761 A1* | 11/2010 | Chang | 345/174 |
| 2010/0295815 A1* | 11/2010 | Zhang | 345/174 |
| 2010/0295816 A1* | 11/2010 | Zhang | 345/174 |
| 2010/0328263 A1* | 12/2010 | Lin | 345/174 |
| 2011/0012864 A1* | 1/2011 | Lin | 345/174 |
| 2011/0025623 A1* | 2/2011 | Lin | 345/173 |
| 2011/0074544 A1* | 3/2011 | D'Souza | 340/5.83 |
| 2011/0157083 A1* | 6/2011 | Hershman et al. | 345/174 |
| 2012/0001854 A1* | 1/2012 | Tikkanen | 345/173 |

* cited by examiner

*Primary Examiner* — Lun-Yi Lao
*Assistant Examiner* — Kelly B Hegarty
(74) *Attorney, Agent, or Firm* — Bacon & Thomas, PLLC

(57) ABSTRACT

A control circuit is applied for a four-wire resistive touch panel including an upper conducting layer having a first signal terminal and a second signal terminal, and a lower conducting layer having a third signal terminal and a fourth signal terminal. The control circuit includes a control unit, a switching unit and a converter. By the switching unit, the first, second, third and fourth signal terminals are switched to connect with an input voltage terminal, a ground terminal and the converter according to a control signal of the control unit. When users press the touch panel, there is a touching point between the upper conducting layer and the lower conducting layer, and the input voltage terminal transmits to the converter through the touching point so plural coordinate values are generated. The gestures such as scrolling, zooming and rotating are distinguished by the touch panel according to the coordinate values.

5 Claims, 6 Drawing Sheets

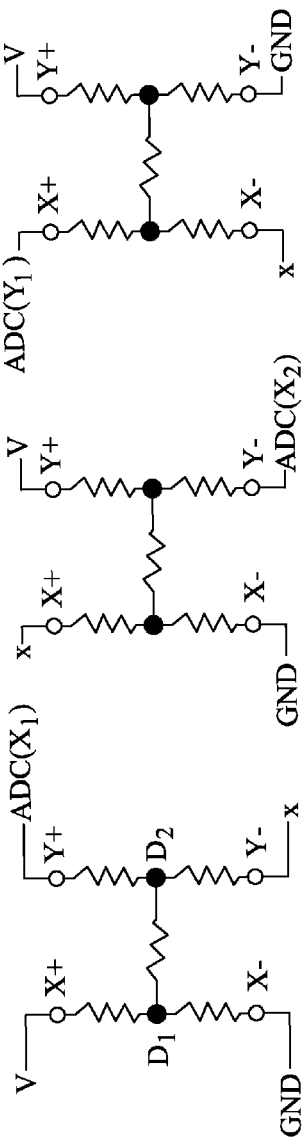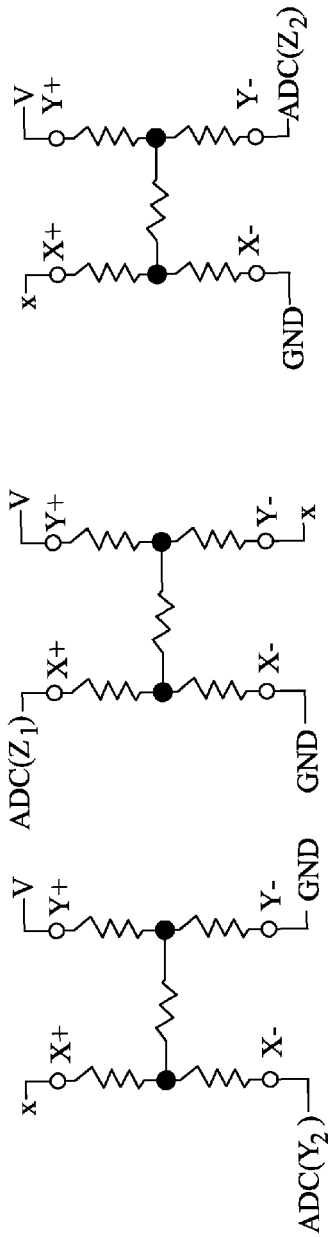
FIG. 4A  FIG. 4B  FIG. 4C
FIG. 4D  FIG. 4E  FIG. 4F

CONTROL CIRCUIT AND DUAL TOUCH CONTROL METHOD THEREOF FOR A FOUR-WIRE RESISTIVE TOUCH PANEL

BACKGROUND OF THE INVENTION (1) Field of the Invention

The invention relates to a control circuit and dual touch control method for a four-wire resistive touch panel, and especially relates to a four-wire resistive touch panel with a double-touch pattern capable of determining gesture of scrolling page, zooming page or rotating page.

(2) Description of the Prior Art

With the technological evolution, the rapid development of human-machine interface is from traditional keyboard and mouse to touch screen or touch panel, which seems to gradually dominate the market. Currently, two primary touch panels are resistive touch panel and capacitive touch panel. Resistive touch panel has features of light weight, thin thickness, less power consumption and being ably operated with a finger, stylus or just about any pointed object but less bright while conversely capacitive touch panel has features of more bright but it must be operated by finger but not an ordinary plastic stylus. Because marketing trend is apt to slim and light trend with energy saving demand, the resistive touch panel is more competitive than the capacitive touch panel in current market.

Currently, resistive technology of touch panel is most popular due to least manufacturing cost. Owing to least manufacturing cost, the most popular of touch panel technology is resistive type, which is mainly classified into two categories, which are four-wire resistive kind and region-segmenting resistive kind. Typically, four-wire resistive touch panel mainly comprises an upper active conducting layer and a lower active conducting layer with insulated spacer layer sandwiched therebetween. When a finger presses down on a point on panel's outer surface, the upper conducting layer and the lower conducting layer become connected at that point so that the touching point is computed by the touch panel, and then is converted into a coordinate value. By means of the coordinate value, a finger touching gesture is determined. However, the gesture of finger operation of conventional four-wire resistive touch panel is confined in single touch capability only, which can not conform to the market requirements.

For meeting the increasing requirements of complicatedly competitive market recently, the improvement of the touch panel is from single-touch to multi-touch function which defines diverse of hand gestures to input, commands, and the advancement of conventional four-wire resistive touch panel is region-segmenting resistive touch panel, which is able to provide adaptable multi-touch function. The technological rationale of the region-segmenting resistive touch panel is that a major touch panel is divided into multiple zones such that each zone is equivalent to a minor four-wire resistive touch panel with a single touch capability respectively. Thereby, the multiple zones of the major touch panel can substantially provide multi-touch function by aggregating overall single touch capabilities of all multiple zones. However, there are two inherent vulnerable drawbacks, which are delicate connecting wire and uneven resistance distribution. For delicate connecting wire, most wires connecting between upper conducting layer and lower conducting layer are made of silver, which are easily breakable in void. For uneven resistance distribution, the properties of divided zone are different from zone to zone and liable to cause uneven resistance distribution with incurred Newton rings so that not only the yield is decreased but also the manufacturing is increased.

Therefore, how to solve improved four-wire resistive touch panel to have multi-touch function with diverse of hand gestures and to obviate all inherent vulnerable drawbacks of region-segmenting resistive touch panel becomes an urgent problem in the technical field of the present invention.

SUMMARY OF THE INVENTION

The object of the invention is to provide a control circuit and dual touch method for providing a four-wire resistive touch panel with a double touch pattern, so as to determine gesture of scrolling page, zooming page or rotating page.

In one aspect, the invention provides an control circuit for a four-wire resistive touch panel. Said four-wire resistive touch panel comprises an upper conducting layer and a lower conducting layer. The upper conducting layer has a first signal terminal and a second signal terminal disposed respective to the first signal terminal. The extensive direction for the first signal terminal is parallel to extensive direction for the second signal terminal. The lower conducting layer has a third signal terminal and a fourth signal terminal disposed respective to the third signal terminal. The extensive direction for the third signal terminal is parallel to extensive direction for the fourth signal terminal. And, the extensive direction for the first signal terminal is perpendicular to extensive direction for the third signal terminal.

Said control circuit comprises a control unit, a circuit switching unit and an analog-to-digit converter. The main objective of control unit is to generate a control signal. The circuit switching unit is electrically connected to the control unit and has an input voltage terminal and a ground terminal disposed thereon, functions to switch the input voltage terminal and the ground terminal thereof in connection with a pair of electrode configuration selected from the group consisting of the first signal terminal, the second signal terminal, the third signal terminal and the fourth signal terminal under the command of the control signal so that two other non-selected signal terminals are left in open free manner. The analog-to-digit converter is electrically connected to the control unit and having a converting terminal disposed thereon, serves to switch the converting terminal thereof in connection with either one of the two non-selected signal terminals previously under the command of control signal. When a user presses the touch panel with a finger, a touching point is formed, which is a depressed point on the upper conducting layer, contacting a corresponding point on the lower conducting layer. And then the input voltage terminal is delivered to the converting terminal via the touching point to generate a digitized coordinate value.

In an embodiment, when the first signal terminal is electrically connected to the input voltage terminal and the second signal terminal is electrically connected to the ground terminal of the circuit switching unit respectively, the analog-to-digit converter generates a first coordinate value as the third signal terminal is electrically connected to the converting terminal of the analog-to-digit converter, while the analog-to-digit converter generates a second coordinate value as the fourth signal terminal is electrically connected to the converting terminal of the analog-to-digit converter. When the third signal terminal is electrically connected to the input voltage terminal and the fourth signal terminal is electrically connected to the ground terminal of the circuit switching unit respectively, the analog-to-digit converter generates a third coordinate value as the first signal terminal is electrically connected to the converting terminal of the analog-to-digit converter, while the analog-to-digit converter generates a fourth coordinate value as the second signal terminal is electrically connected to the converting terminal of the analog-to-digit converter. When the third signal terminal is electrically connected to the input voltage terminal and the second signal terminal is electrically connected to the ground terminal of the circuit switching unit respectively, the analog-to-digit converter generates a fifth coordinate value as the first signal terminal is electrically connected to the converting terminal of the analog-to-digit converter, while the analog-to-digit converter generates a sixth coordinate value as the fourth signal terminal is electrically connected to the converting terminal of the analog-to-digit converter.

In another aspect, the invention provides a dual touch method for a four-wire resistive touch panel. Said four-wire resistive touch panel comprises an upper conducting layer and a lower conducting layer. The upper conducting layer has a first signal terminal disposed in parallel with X coordinate axis of the touch panel and a second signal terminal disposed in parallel with X coordinate axis of the touch panel. The lower conducting layer has a third signal terminal disposed in parallel with Y coordinate axis of the touch panel and a fourth signal terminal disposed in parallel with Y coordinate axis of the touch panel, such that the X coordinate axis is perpendicular to Y coordinate axis.

Said dual touch method comprising steps of: providing a control unit utilized to generate a control signal; providing a circuit switching unit having an input voltage terminal and a ground terminal to switch the input voltage terminal and the ground terminal thereof in connection with a pair electrode configuration selected from the group consisting of the first signal terminal, the second signal terminal, the third signal terminal and the fourth signal terminal under the command of the control signal so that two other non-selected signal terminals are left in open free manner; providing an analog-to-digit converter, electrically connected to the control unit and having a converting terminal, for switching the converting terminal thereof in connection with either one of the two non-selected signal terminals previously under the command of the control signal; when a user presses the touch panel with a finger, a touching point is formed, which is a depressed point on the upper conducting layer contacting a corresponding point on the lower conducting layer. And then an input voltage from the input voltage terminal is delivered to the converting terminal via the touching point to generate a plurality of digitized coordinate values; capturing the digitized coordinate values including the first coordinate value and the second coordinate value on the X coordinate axis, the third coordinate value and the fourth coordinate value on the Y coordinate axis, as well as the fifth coordinate value and the sixth coordinate value on the Z coordinate axis; determining whether the touching point is a double-touch pattern in accordance with the third coordinate value, the fifth coordinate value and the sixth coordinate value; if the double-touch pattern is detected and recognized, calculating a first variance for the first coordinate value and third coordinate value while calculating a second variance for the second coordinate value and the fourth coordinate value; determining whether the result is a first categorical indication in accordance with the first variance and the second variance; calculating a correlation coefficient between the first coordinate value and the second coordinate value; calculating a first standard deviation with the first coordinate value and the second coordinate value, then a second standard deviation with the first coordinate value, the second coordinate value, the third coordinate value and the fourth coordinate value, and determining whether the result is a second categorical indication or a third categorical indication in accordance with the first standard deviation, the second standard deviation and the correlation coefficient.

In an embodiment, the order sequence of determining whether the result is the first categorical indication, the second categorical indication and the third categorical indication is interchangeable in suitably adaptable manner. Said first categorical indication refers to a gesture of scrolling page. Said second categorical indication refers to a gesture of zooming page. Said third categorical indication refers to a gesture of rotating page.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

FIGS. 4A through 4F are six equivalent circuitry illustrative views of a control circuit and dual touch method thereof for a four-wire resistive touch panel in an exemplary embodiment of the present invention.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized, and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1:
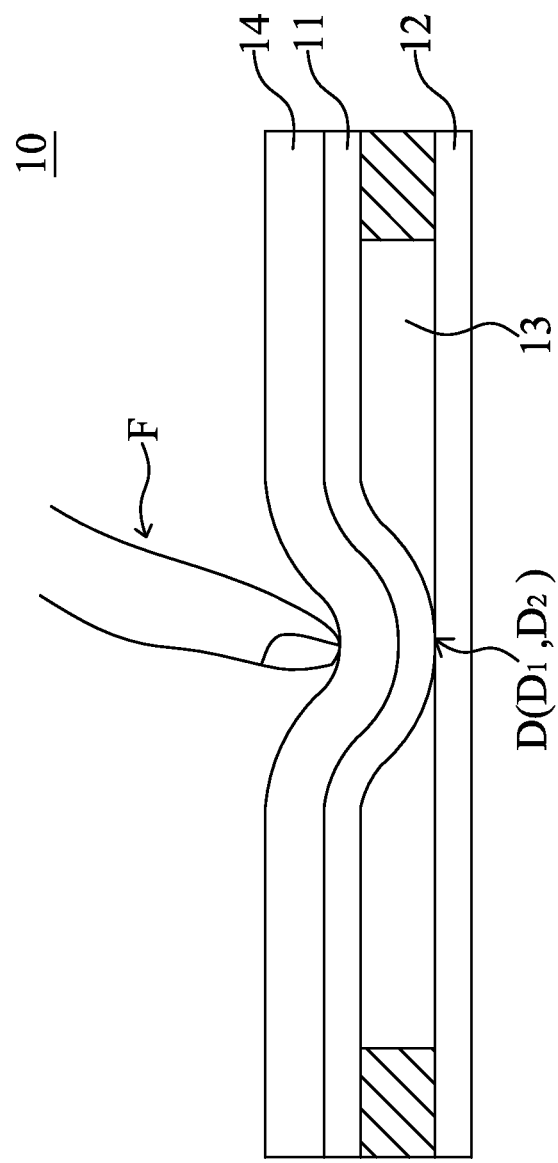
FIG. 1 is a partial structural view of a four-wire resistive touch panel in an exemplary embodiment of the present invention.

Please refer to FIG. 1, which is a partial structural view of a four-wire resistive touch panel in an exemplary embodiment of the present invention. A four-wire resistive touch panel 10 comprises a protective layer 14, an upper conducting layer 11, and a lower conducting layer 12 with an isolated layer 13 sandwiched therebetween such that the protective layer 14 is disposed onto the top surface of the upper conducting layer 11 to protect the upper conducting layer 11 from damage by finger F, touching electronic pen (stylus) or any pointed object for input.

Figure 2:
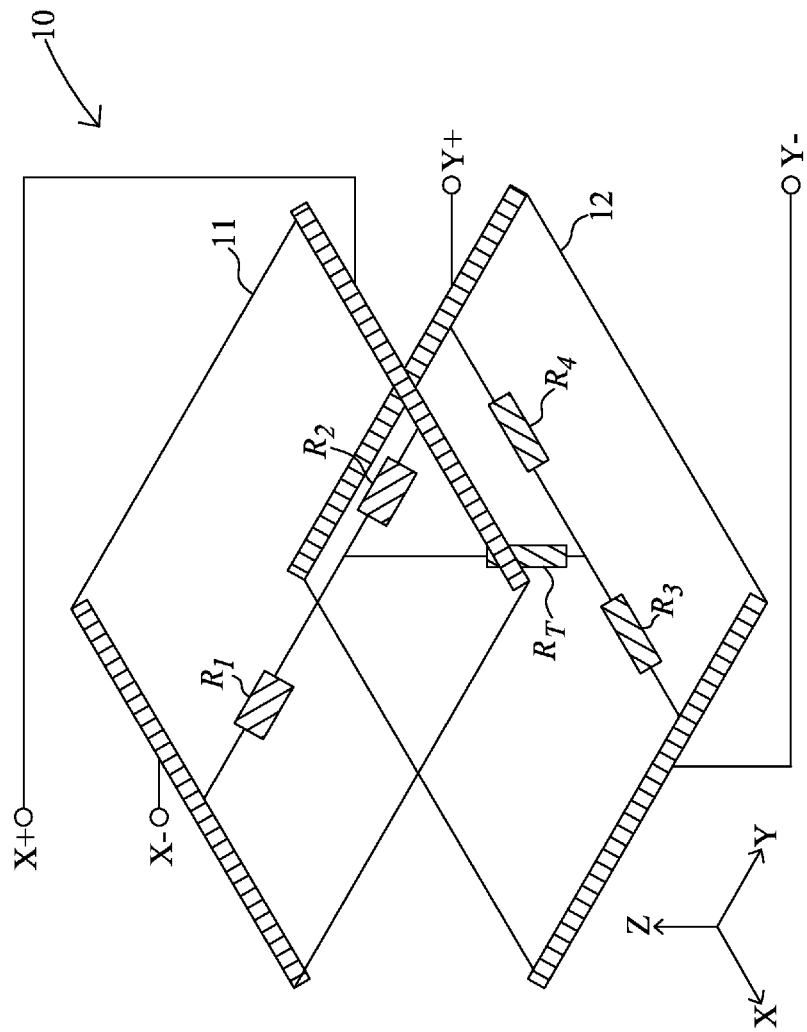
FIG. 2 is a simplified circuitry schematic view of a four-wire resistive touch panel in an exemplary embodiment of the present invention.

Please refer to FIG. 2, which is a simplified circuitry schematic view of a control circuit for a four-wire resistive touch panel in an exemplary embodiment of the present invention, wherein a Cartesian rectangular coordinate system is also indicated for direction reference such that each of the X coordinate axis, the Y coordinate axis and the Z coordinate axis is perpendicular to other two axes in accordance with the feature of the Cartesian rectangular coordinate system. On the upper conducting layer 11, an electrode array of first signal terminal $X_+$ is disposed at one edge thereof in parallel with X coordinate axis while another electrode array of second signal terminal $X_-$ is also disposed at another facing edge thereof in parallel with X coordinate axis. The first signal terminal $X_+$ is disposed respective to the second signal terminal $X_-$. Likewise, on the lower conducting layer 12, an electrode array of third signal terminal $Y_+$ is disposed at one edge thereof in parallel with Y coordinate axis while another electrode array of fourth signal terminal $Y_-$ is also disposed at another facing edge thereof in parallel with Y coordinate axis. The third signal terminal $Y_+$ is disposed respective to the fourth signal terminal $Y_-$. Wherein, a plurality of resistors $R_1$ and $R_2$ are spread over the upper conducting layer 11 while a plurality of resistors $R_3$ and $R_4$ are spread over the lower conducting layer 12. Moreover, an equivalent resistors $R_T$ is connected between the upper conducting layer 11 and lower conducting layer 12 to denote dielectric of corresponding isolated layer 13.

Figure 3:
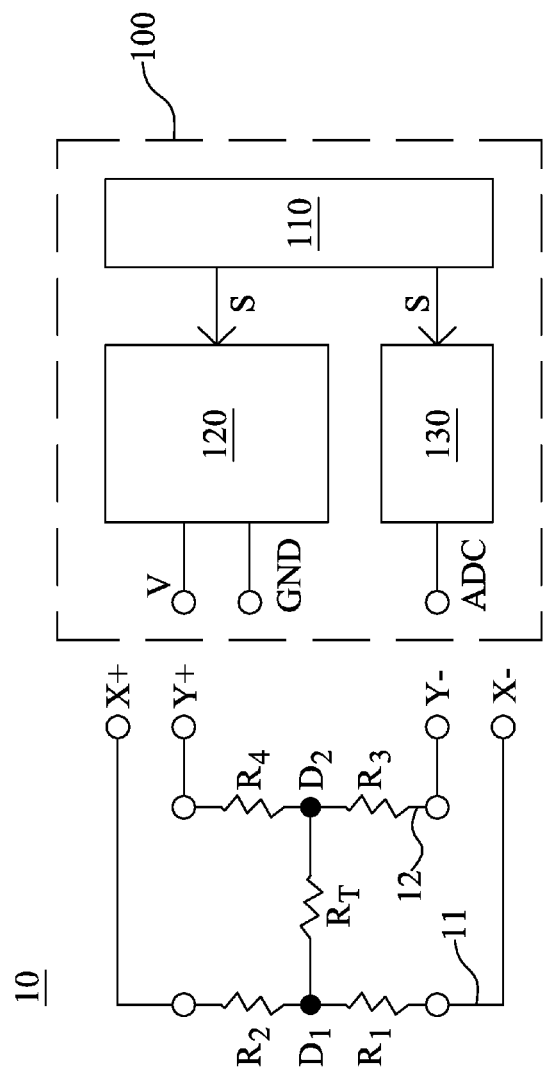
FIG. 3 is an illustrative view showing a control circuit in a four-wire resistive touch panel for an exemplary embodiment of the present invention.

Please refer to FIG. 3, which is an illustrative view showing a control circuit in a four-wire resistive touch panel for an exemplary embodiment of the present invention. The control circuit 100 includes a control unit 110 for generating a control signal S, a circuit switching unit 120 and an analog-to-digit converter 130. The circuit switching unit 120 is electrically connected to the control unit 110 and has an input voltage terminal V and a ground terminal GND disposed thereon, functions to switch the input voltage terminal V and ground terminal GND thereof in connection with any pair electrode configuration selected from four electrodes of first signal terminal $X_+$, second signal terminal $X_-$, third signal terminal $Y_+$ and fourth signal terminal $Y_-$ under the command of control signal S so that two other non-selected electrodes are left in open free manner. After that, the analog-to-digit converter 130 is also electrically connected to the control unit 110 and has a converting terminal ADC disposed thereon, serves to switch the converting terminal ADC thereof in connection with either one open free electrode of two non-selected electrodes previously under the command of control signal S.

Please refer to FIGS. 1 through 3. When a user presses the touch panel 10 with a finger F, a touching point 11) is formed, which is a depressed point $D_1$ on the upper conducting layer 11 contacting a corresponding point $D_2$ on the lower conducting layer 12 with a resistor $R_T$ connected therebetween. When a pair electrode configuration selected from four electrodes of first signal terminal $X_+$, second signal terminal $X_-$, third signal terminal $Y_+$ and fourth signal terminal $Y_-$ respectively connected to the input voltage terminal V and ground terminal GND of the circuit switching unit 120 in the control circuit 100, then either one open free electrode of two non-selected electrodes previously is connected to the converting terminal ADC of the analog-to-digit converter 130, the input voltage terminal V is delivered to the converting terminal ADC via touching point D ($D_1$, $D_2$) so that the analog-to-digit converter 130 will get a contacting voltage and generate a coordinate value, which is digitized from the voltage difference between the input voltage terminal V and contacting voltage processed by the analog-to-digit converter 130. Wherein, the magnitude of the contacting voltage will be changed in accordance with the location of the touching point D ($D_1$, $D_2$) because each value of the resistors $R_1$, $R_2$, $R_3$ or $R_4$ is affected by location of the touching point D ($D_1$, $D_2$).

Besides, in the touch panel 10, a processing unit (not shown in the figures) is disposed to determine finger operation gesture of the user such as rotating, scrolling or zooming a page on the screen via processing foregoing coordinate value generated. If user does not press the touch panel 10, the processing unit will remain idle because of no contact between the upper conducting layer 11 and lower conducting layer 12.

Please refer to FIGS. 4A through 4F, which are six equivalent circuitry illustrative views of a control circuit and dual touch method thereof for a four-wire resistive touch panel in an exemplary embodiment of the present invention.

As shown in FIG. 4A, when the first signal terminal $X_+$ is connected to the input voltage terminal V and the second signal terminal $X_-$ is connected to the ground terminal GND of the circuit switching unit 120 in the control circuit 100 respectively while the third signal terminal $Y_+$ is connected to the converting terminal ADC of the analog-to-digit converter 130, the analog-to-digit converter 130 will generate a first coordinate value $X_1$.

As shown in FIG. 4B, when the first signal terminal $X_+$ is connected to the input voltage terminal V and the second signal terminal $X_-$ is connected to the ground terminal GND of the circuit switching unit 120 in the control circuit 100 respectively while the fourth signal terminal $Y_-$ is connected to the converting terminal ADC of the analog-to-digit converter 130, the analog-to-digit converter 130 will generate a second coordinate value $X_2$.

As shown in FIG. 4C, when the third signal terminal $Y_+$ is connected to the input voltage terminal V and the fourth signal terminal $Y_-$ is connected to the ground terminal GND of the circuit switching unit 120 in the control circuit 100 respectively while the first signal terminal $X_+$ is connected to the converting terminal ADC of the analog-to-digit converter 130, the analog-to-digit converter 130 will generate a third coordinate value $Y_1$.

As shown in FIG. 4D, when the third signal terminal $Y_+$ is connected to the input voltage terminal V and the fourth signal terminal $Y_-$ is connected to the ground terminal GND of the circuit switching unit 120 in the control circuit 100)

respectively while the second signal terminal X_ is connected to the converting terminal ADC of the analog-to-digit converter 130, the analog-to-digit converter 130 will generate a fourth coordinate value $Y_2$.

As shown in FIG. 4E, when the third signal terminal $Y_+$ is connected to the input voltage terminal V and the second signal terminal X_ is connected to the ground terminal GND of the circuit switching unit 120 in the control circuit 100 respectively while the first signal terminal $X_+$ is connected to the converting terminal ADC of the analog-to-digit converter 130, the analog-to-digit converter 130 will generate a fifth coordinate value $Z_1$.

As shown in FIG. 4F, when the third signal terminal $Y_+$ is connected to the input voltage terminal V and the second signal terminal X_ is connected to the ground terminal GND of the circuit switching unit 120 in the control circuit 100 respectively while the fourth signal terminal Y_ is connected to the converting terminal ADC of the analog-to-digit converter 130, the analog-to-digit converter 130 will generate a sixth coordinate value $Z_2$.

Figure 5:
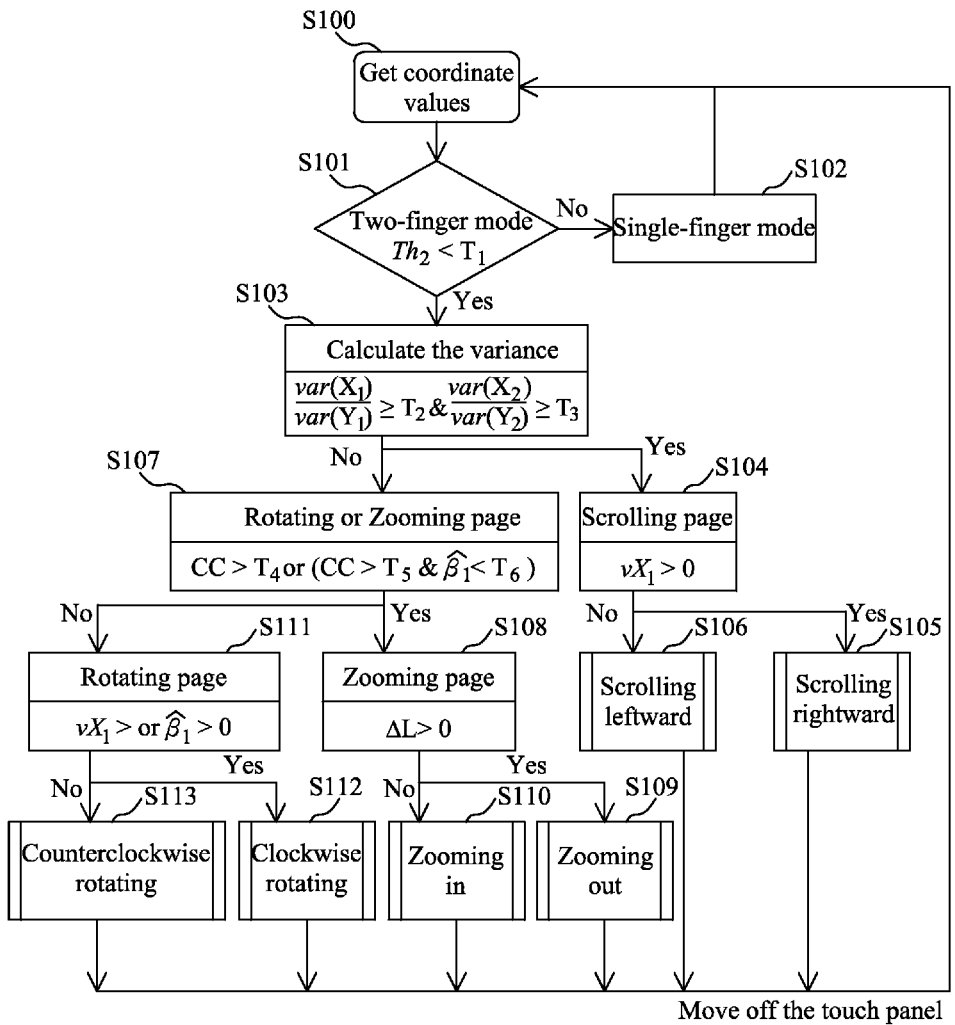
FIG. 5 is a flow chart showing dual touch process of a dual touch method for a four-wire resistive touch panel in an exemplary embodiment of the present invention.

Please refer to FIG. 5, which is a flow chart showing dual touch process of a dual touch method for a four-wire resistive touch panel in an exemplary embodiment of the present invention, wherein, all steps are performed by a processing unit disposed in the touch panel 10 and recited as below.

Please retrospectively refer to FIG. 3 and foregoing description associated. As disclosed above, each of six coordinate values $X_1, X_2, Y_1, Y_2, Z_1$ and $Z_2$ can be generated when a pair electrode configuration suitably selected from four electrodes of first signal terminal $X_+$, second signal terminal X_, third signal terminal $Y_+$ and fourth signal terminal Y_ are respectively connected to the input voltage terminal V and ground terminal GND of the circuit switching unit 120 in the control circuit 100, then either one open free electrode of two non-selected electrodes previously is is suitably connected to the converting terminal ADC of the analog-to-digit converter 130.

Step S100: the processing unit gets six coordinate values including first coordinate value $X_1$ and second coordinate value $X_2$ on the X coordinate axis, third coordinate value $Y_1$ and fourth coordinate value $Y_2$ on the Y coordinate axis, as well as fifth coordinate value $Z_1$ and sixth coordinate value $Z_2$ on the Z coordinate axis, wherein each of the X coordinate axis, the Y coordinate axis and the Z coordinate axis is perpendicular to other two axes in accordance with the feature of the Cartesian rectangular coordinate system.

Step S101: Determine whether the touching point D is a double-touch pattern in accordance with the third coordinate value $Y_1$, fifth coordinate value $Z_1$ and sixth coordinate value $Z_2$, namely determine whether the user uses gesture of two-finger mode to press the touch panel 10 by a determining discriminant as below.

$$Th_2 = \left(\frac{Z_2}{Z_1} - 1\right) * Y_1 \quad (1)$$

If $Th_2$ value is less than a nominal threshold value $T_1$, then the gesture of the user is determined as two-finger mode in pressing the touch panel 10, and continually execute step S103. Or, if not, then continually execute step S102.

Step S102: if $Th_2$ value is greater than a nominal threshold value $T_1$, then the gesture of the user is determined as single-finger mode in pressing the touch panel 10, and return to step S100.

Step S103: When the gesture of the user is determined as two-finger mode, calculate the first variance for the first coordinate value $X_1$ and third coordinate value $Y_1$ by a determining discriminant as below.

$$\frac{\operatorname{var}(X_1)}{\operatorname{var}(Y_1)} \quad (2)$$

And, calculate the second variance for the second coordinate value $X_2$ and fourth coordinate value $Y_2$ by a determining discriminant as below.

$$\frac{\operatorname{var}(X_2)}{\operatorname{var}(Y_2)} \quad (3)$$

Determine whether the discriminant result is a first categorical indication of scrolling page action in accordance with the first variance and second variance, if the first variance is greater than a nominal threshold value $T_2$ and the second variance is greater than a nominal threshold value $T_3$ so that it meets a determining discriminant as below, the gesture of the user is determined as two-finger mode with moving pattern of same direction to achieve a scrolling page action, and continually execute step S104. Or, if not, then continually execute step S107.

$$\frac{\operatorname{var}(X_1)}{\operatorname{var}(Y_1)} \geq T_2 \text{ and } \frac{\operatorname{var}(X_2)}{\operatorname{var}(Y_2)} \geq T_3 \quad (4)$$

Step S104: From foregoing steps, the gesture of the user is determined as a scrolling page action of two-finger mode. Upon pressing the touch panel 10, calculate first coordinate value $X_1$ and sum of the displacement thereof by two fingers of the user, which is denoted as $vX_1$.

If $vX_1$ is greater than zero (namely $vX_1>0$), it means that the user presses the touch panel 10 with two fingers and moves to a first direction, and continually execute step S105.

Or, if $vX_1$ is less than zero (namely $vX_1<0$), it means that the user presses the touch panel 10 with two fingers and moves to another second direction, which is opposing to the first direction, then continually execute step S106.

Figure 6A:
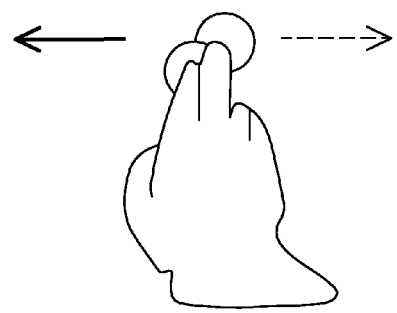
FIGS. 6A through 6C are operational views respectively showing gesture for scrolling page, zooming page and rotating page of a control circuit and dual touch method thereof for a four-wire resistive touch panel in an exemplary embodiment of the present invention.

Step S105: If $vX_1$ is greater than zero (namely $vX_1>0$), with reference to FIG. 6A, the gesture of the user is determined as two-finger mode with moving pattern of same direction as indicated by the dotted line to achieve a scrolling rightward action, then return to step S100 if fingers of the user move off the touch panel 10.

Step S106: If $vX_1$ is less than zero (namely $vX_1<0$), with reference to FIG. 6A, the gesture of the user is determined as two-finger mode with moving pattern of same direction as indicated by the solid line to achieve a scrolling leftward action, then return to step S100 if fingers of the user move off the touch panel 10.

Step S107: Calculate a correlation coefficient CC between the first. coordinate value $X_1$ and second coordinate value $X_2$ by mathematical expression as below.

$$CC = \frac{\sum_{i=1}^{n} |(X_{1i} - X_{2i})|}{\sqrt{\sum_{i=1}^{n} (X_{1i} - \overline{X}_1)^2 \sum_{i=1}^{n} (X_{2i} - \overline{X}_2)^2}} \quad (5)$$

Wherein, $X_{1i}$, denotes different values measured with time lapse of the first coordinate value $X_1$, namely $X_1$ function of time while $X_{2i}$ denotes different values measured with time lapse of the second coordinate value $X_2$, namely $X_2$ function of time. $\overline{X}_1$ denotes a mean value for summation of all $X_{1i}$ while $\overline{X}_2$ denotes a mean value for summation of all $X_{2i}$. Moreover, a first standard deviation $S_{XX}$ with first coordinate value $X_1$ and second coordinate value $X_2$, then a second standard deviation $S_{XY}$ with first coordinate value $X_1$, second coordinate value $X_2$, third coordinate value $Y_1$ and fourth coordinate value $Y_2$ are also calculated such that a quotient, which results from dividing the first standard deviation $S_{XX}$ to the second standard deviation $S_{XY}$, is denoted by $\hat{\beta}_1$.

The definitions, calculations of standard deviation $S_{XX}$, second standard deviation $S_{XY}$ and the quotient $\hat{\beta}_1$ are expressed by following mathematical formula.

$$\hat{\beta}_1 = \frac{S_{XY}}{S_{XX}} = \frac{\sum_{i=1}^{n}(X_i - \overline{X})(Y_i - \overline{Y})}{\sum_{i=1}^{n}(X_i - \overline{X})^2} \quad (6)$$

Determine whether the discriminant result is a second categorical indication of zooming page action or a third categorical indication of rotating page action in accordance with correlation coefficient CC for the first coordinate value $X_1$ with second coordinate value $X_2$ and the quotient $\hat{\beta}_1$ of the first standard deviation $S_{XX}$ dividing second standard deviation $S_{XY}$.

If the correlation coefficient CC is greater than a nominal threshold value $T_4$, or the correlation coefficient CC is greater than another nominal threshold value $T_5$ and the quotient $\hat{\beta}_1$ of the standard deviation $S_{XX}$ dividing second standard deviation $S_{XY}$ is less than the other nominal threshold value $T_6$, the gesture of the user is determined, as two-finger mode with moving pattern of opposing direction to achieve a zooming page action, and continually execute step S108. Or, if not, then continually execute step S111.

Step S108: From foregoing steps, the gesture of the user is determined as a zooming page action of two-finger mode with moving pattern of opposing direction, then calculate a distance value $L_i$ by following mathematical equation. Wherein, $L_i$ denotes different values measured with time lapse of the distance L, namely L function of time, $X_{1i}$ denotes different values measured with time lapse of the first coordinate value $X_1$, namely $X_1$ function of time while $X_1$ denotes a mean value for summation of all $X_{1i}$. Similarly, $X_{2i}$ and $X_2$, $Y_{1i}$ and $Y_1$ and $Y_{2i}$ and $Y_2$ are denoted the same manner as $X_{1i}$ and $X_1$.

$$L_i = \sqrt{(X_{1i} - X_{2i})^2 + (Y_{1i} - Y_{2i})^2} \quad (7)$$

Let $L_1$ denotes an initial distance value measured at the time upon pressing the touch panel 10 with two fingers of the user while $L_2$ denotes a final distance value measured at the time upon two fingers of the user leaving the touch panel 10. And distance difference $\Delta L$ is defined as the difference between $L_2$ and $L_1$, namely $\Delta L = L_2 - L_1$.

If $\Delta L$ is greater than zero, then the gesture of the user is determined as a zooming page action of two-finger mode with moving pattern of mutually approaching fashion. Or, if not, then the gesture of the user is determined as a zooming page. action of two-finger mode with moving pattern of mutually departing fashion.

Figure 6B:
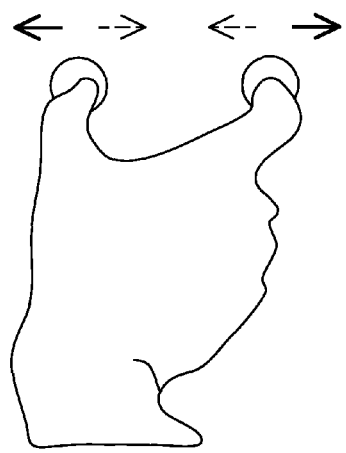

Step S109: If $\Delta L$ is greater than zero (namely $\Delta L > 0$), with reference to FIG. 6B, the gesture of the user is determined as two-finger mode with moving pattern of mutually approaching fashion as indicated by the dotted line to achieve a zooming out action, then return to step S100 if fingers of the user move off the touch panel 10.

Step S110: If $\Delta L$ is less than zero (namely $\Delta L < 0$), with reference to FIG. 6B, the gesture of the user is determined as two-finger mode with moving pattern of mutually departing fashion as indicated by the solid line to achieve a zooming in action, then return to step S100 if fingers of the user move off the touch panel 10.

Step S111: This step is derived from step S107. Upon pressing the touch panel 10 with two fingers of the user, calculate first coordinate value $X_1$ and sum of one finger displacement thereof which is denoted as $vX_1$.

If $vX_1$ is greater than zero (namely $vX_1 > 0$), it means that the user presses the touch panel 10 with two fingers and one finger moves to a first direction.

Or, if $vX_1$ is less than zero (namely $vX_1 < 0$), it means that the user presses the touch panel 10 with two fingers and one finger moves to another second direction, which is opposing to the first direction.

Besides, foregoing gesture determining method can be also replaced by the quotient $\hat{\beta}_1$ of the standard deviation $S_{XX}$ dividing second standard deviation $S_{XY}$.

If $\hat{\beta}_1$ is greater than zero (namely $\hat{\beta}_1 > 0$), it means that the user presses the touch panel 10 with two fingers and one finger moves to a first direction.

Or, if $\hat{\beta}_1$ is less than zero (namely $\hat{\beta}_1 < 0$), it means that the user presses the touch panel 10 with two fingers and one finger moves to another second direction, which is opposing to the first direction.

Figure 6C:
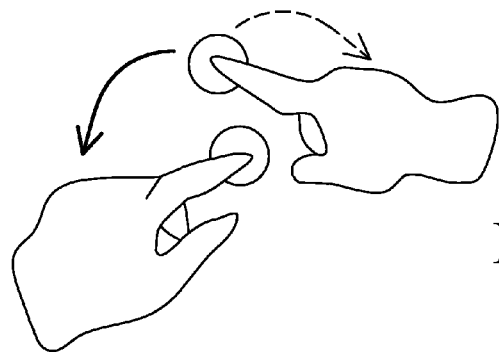

Step S112: If $\hat{\beta}_1$ is greater than zero (namely $\hat{\beta}_1 > 0$) or $vX_1$ is greater than zero (namely $vX_1 > 0$), with reference to FIG. 6C, the gesture of the user is determined as two-finger mode with moving pattern for one finger in clockwise (CW) rotating fashion as indicated by the dotted line to achieve a CW rotating action, then return to step S100 if fingers of the user move off the touch panel 10.

Step S113: If $\hat{\beta}_1$ is less than zero (namely $\hat{\beta}_1 < 0$) or $vX_1$ is less than zero (namely $(vX_1) < 0$), with reference to FIG. 6C, the gesture of the user is determined as two-finger mode with moving pattern for one finger in counterclockwise (CCW) rotating fashion as indicated by the solid line to achieve a CCW rotating action, then return to step S100 if fingers of the user move off the touch panel 10.

Besides, though the order sequence of first categorical indication, second categorical indication and third categorical indication is arranged as foregoing order in this exemplary embodiment, but it is meant to be limited in this manner only. Namely, the order sequence for the steps S103 through S106 for scrolling gesture of the first categorical indication, the steps S107 through S110 for zooming gesture of the second categorical indication and the steps S110 through S113 for rotating gesture of the third categorical indication in the flowchart (as shown in FIG. 5) is interchangeable in suitably adaptable manner.

Concluding the disclosure heretofore, the control circuit and dual touch method thereof for a four-wire resistive touch panel of the present invention is implemented as following means. Under command of a control signal S generated from a control unit 110 in a control circuit 100, a pair electrode configuration selected from four electrodes of first signal terminal $X_+$, second signal terminal $X_-$, third signal terminal $Y_+$ and fourth signal terminal $Y_-$ are respectively connected to a input voltage terminal V and ground terminal GND of a circuit switching unit 120 in the control circuit 100, then either one open free electrode of two non-selected electrodes previously is connected to a converting terminal ADC of a analog-to-digit converter 130, When the user presses the touch panel 10 with two fingers, an analog-to-digit converter 130 in the control circuit 100 generates six digitized. coordinate values, which are further processed to determine gesture of scrolling page, zooming page or rotating page.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention, it should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A dual touch control method for a four-wire resistive touch panel, wherein said four-wire resistive touch panel comprises an upper conducting layer with a first signal terminal disposed in parallel with X coordinate axis of the touch panel and a second signal terminal is disposed in parallel with X coordinate axis of the touch panel as well as a lower conducting layer with a third signal terminal disposed in parallel with Y coordinate axis of the touch panel and a fourth signal terminal disposed in parallel with Y coordinate axis of the touch panel, such that the X coordinate axis is perpendicular to Y coordinate axis; said dual touch method comprising steps of:

providing a control unit utilized to generate a control signal;

providing a circuit switching unit having an input voltage terminal and a ground terminal to switch the input voltage terminal and the ground terminal in connection with a pair electrode configuration selected from the group consisting of the first signal terminal, the second signal terminal, the third signal terminal and the fourth signal terminal under the command of the control signal so that two other non-selected signal terminals are left in open free manner;

providing an analog-to-digit converter, electrically connected to the control unit and having a converting terminal, for switching the converting terminal thereof in connection with either one of the two non-selected signal terminals previously under the command of the control signal;

forming a touching point when a user presses the touch panel with a finger, wherein the touching point is a depressed point on the upper conducting layer contacting a corresponding point of the lower conducting layer, so that a input voltage from the input voltage terminal is delivered to the converting terminal via the touching point to generate a plurality of digitized coordinate values;

capturing the digitized coordinate values including the first coordinate value and the second coordinate value on the X coordinate axis, the third coordinate value and the fourth coordinate value on the Y coordinate axis, as well as the fifth coordinate value and the sixth coordinate value on the Z coordinate axis;

determining whether the touching point is a double-touch pattern in accordance with the third coordinate value, the fifth coordinate value and the sixth coordinate value; if the double-touch pattern is detected and recognized, calculating a first variance for the first coordinate value and third coordinate value and calculating a second variance for the second coordinate value and the fourth coordinate value;

determining whether the result is a first categorical indication in accordance with the first variance and the second variance;

calculating a correlation coefficient between the first coordinate value and the second coordinate value;

calculating a first standard deviation with the first coordinate value and the second coordinate value, then a second standard deviation with the first coordinate value, the second coordinate value, the third coordinate value and the fourth coordinate value; and determining whether the result is a second categorical indication or a third categorical indication in accordance with the first standard deviation, the second standard deviation and the correlation coefficient.

2. The dual touch control method for a four-wire resistive touch panel of claim 1, wherein the sequence of determining whether the result is the first categorical indication, the second categorical indication and the third categorical indication is interchangeable in suitably adaptable manner.

3. The dual touch control method for a four-wire resistive touch panel of claim 1, wherein said first categorical indication refers to a gesture of scrolling page.

4. The dual touch control method for a four-wire resistive touch panel of claim 1, wherein said second categorical indication refers to a gesture of zooming page.

5. The dual touch control method for a four-wire resistive touch panel of claim 1, wherein said third categorical indication refers to a gesture of rotating page.

* * * * *